Figure 1:
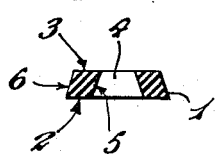

Nov. 16, 1965     H. P. DOETSCH     3,218,051

HIGH PRESSURE SEALS

Filed May 16, 1962

Inventor
Hans Peter Doetsch
By Stevens, Davis, Miller & Mosher
Attorneys

United States Patent Office 3,218,051
Patented Nov. 16, 1965

3,218,051
HIGH PRESSURE SEALS
Hans Peter Doetsch, Altdrossenfeld 32,
Bayreuth, Germany
Filed May 16, 1962, Ser. No. 195,051
Claims priority, application Germany,
May 19, 1961, D 36,130
7 Claims. (Cl. 267—1)

The present invention relates to high pressure seals, methods of making such seals and gas pressure springs employing such seals.

One of the most difficult problems in the whole technique of relatively moving parts is to seal these parts off from one another, as one often needs to do under very varied conditions. According to the individual problems posed for such seals countless solutions have been worked out, ranging for example from the long-known stuffing box to the complex metal segment seal. As already stated, all these known seals have been developed for mainly quite specific purposes. But apart from these there is still a series of applications for which all these known seals offer no practical solution, since they are either too costly and too large, too heavy or generally speaking too expensive or too complex and above all since they do not have the required durability.

The present invention aims to create a seal for high pressures (for example over 50 atmospheres absolute pressure) for parts which move predominantly longitudinally in relation to each other, and where in certain cases a rotary movement may be superimposed on the longitudinal movement. At the same time a predetermined minimum pressure has to be maintained over a long period in the space to be sealed. But the seal must of course be cheap, simple, small and light and—as already stated—above all durable.

These conditions have to be fulfilled, for example, preferably in the case of gas pressure springs of telescopic construction, that is to say, where a piston slides in a closed cylinder, the piston rod projecting out of one end of the cylinder and a specific amount of gas, forming a resilient gas cushion, is inserted between the piston and the cylinder wall opposite. Of course such gas pressure springs are useful in practice only if they remain tightly sealed throughout a large number of movements (for example at least $10^6$), so that no gas can escape. This means that this is just the case where the highest demands are made of the durability of the seal.

It has now been found that this aim may be achieved by a seal comprising a thin flat disc of highly resilient, abrasion-resistant material, such as that known by the trade name of Vulkollan, or materials with similar properties, the hole therethrough for the passage of the piston rod or the like to be sealed off being frusto conical, as sharp-edged as possible at its narrow end and smaller in diameter than the rod to be passed through it at its narrow end.

When this sealing disc is applied to the rod to be sealed it is deformed in such a way that the hole assumes a cylindrical shape and the disc faces which were flat in the free state now assume the frusto conical shape. If the inner frusto conical face is pressed against a flat abutment (for example against the end of the cylinder by the pressure prevailing in a gas pressure spring), then the sealing disc reassumes a flat position. The resilient bias and thus the sealing effect increase progressively along the rod towards the part of the hole which was originally narrowest.

In certain cases the peripheral surface at the outer edge of the free flat sealing disc may be given a frusto conical shape, the smaller diameter being on the same side of the disc as the smaller diameter of the hole.

The direction of assembly is such that the side of the sealing disc with the originally smaller hole diameter is directed towards the high pressure to be sealed off. The result is that when the disc is pressed flat its resilient bias increases towards the higher pressure in the use position. The edge of the sealing hole located at the side of the disc against which the pressure is applied thus shears off the medium to be sealed, for example gas pressure, from the surface of the piston rod in an almost knife-like manner.

It has been found that the sealing effect can be considerably improved if the material used for the sealing disc is within certain limits capable of dissolving or absorbing oil.

Such seals have proved remarkably successful when fitted in gas pressure springs, and when the springs are designed according to the invention, using seals according to the invention, the process of filling the springs is further simplified.

The gas pressure spring according to the invention comprises a cylinder in which a piston slides, the piston rod projecting out of one end of the cylinder and being guided in it by a guide member which also serves as a surface on which the sealing disc may bear on the pressure side thereof, while the end of the cylinder from which the piston rod projects is used as an opposite bearing surface for the sealing disc. The entire gas pressure spring thus comprises only five—or in certain cases four—extremely simply designed parts, so that all conceivable requirements as to the size, or rather the smallness, and construction of the gas pressure spring can be met without any difficulty. A further advantage of constructing the gas pressure spring according to the invention is that, since the seal is also constructed and fitted according to the invention, it can also be used as a filling valve for the gas pressure spring.

For this purpose the piston rod is brought to bear on an abutment so that it cannot be urged outwardly as the pressure rises in the cylinder, and the filling gas is admitted through the annular aperture which still exists between the individual structural parts in this position. Thus the gas passes through the annular aperture between the piston rod and the passage for it in the end of the cylinder, on through the annular aperture between the cylinder and the outer edge of the sealing disc, and finally through the annular aperture between the guide and the cylinder on the one hand and the guide and the piston rod on the other.

If the abutment for the piston rod is removed the rod slides outwards, so that the sealing disc assumes its working position, in which it forms a seal against both the piston rod and the inner wall of the cylinder between the guide and the end of the cylinder.

If appropriate, the requisite amount of lubricant can be inserted with the pressure gas through the annular aperture between the rigid parts, which are normally of metal.

The deformation of the sealing disc necessary to seal it against the cylinder wall can be produced if its clamping action on the piston rod is such that the resultant friction is sufficient for the desired deformation. Another way of producing the deformation is to let the pressure out of the filling device quickly, so that the limited flow in the aperture between the sealing disc and the inner wall of the cylinder creates an internal pressure which applies the disc. Deformation can finally be brought about by urging the guide against the seal at the outward movement of the rod. It is preferable, however, to use all three methods together.

The sealing discs according to the invention can preferably be made by stamping out with circular cutting tools on a backing made of a soft, and as far as possible, homogeneous material. It has in fact been proposed to underlay a flexible stamping backing, but this was done in order to protect the stamping tool from being damaged or destroyed once it has cut through the material to be processed. According to the invention on the other hand, such a backing is used so that the highly resilient, abrasion-resistant material to be stamped can give into the soft backing and, by a stamping process using cylindrical cutting tools, the walls surrounding the hole in the sealing disc and forming the outer edge of the disc can be made frusto conical. The fact that the structure of the backing material is as fine and homogeneous as possible moreover gives a sharp, clean cut in the stamped sealing material.

According to a development of this process the stamping process can be carried out wtih a stamping tool which is resiliently impressed in the sealing material until shortly before the final cut-through, then briefly arrested, and only then pressed right through to complete the stamping process. During the short stoppage of the stamping tool the sliding friction between its side surfaces and the sealing material to be cut becomes a static friction. When the cutting movement is resumed, i.e. until the static friction is overcome, the sealing material is impressed still deeper into the backing material. This results in a gradation in the taper of the inner and outer surfaces of the sealing disc such as to meet the demands made of the disc, as discussed in detail above.

When making the sealing disc according to the invention it is preferable to proceed so that any one part of the backing material is used only once for the stamping process. Two superimposed strips of sealing material and backing material should therefore preferably be passed step by step through the stamping machine.

The tests carried out have shown that quite outstanding sealing effects on the lines of the invention can be obtained by using Vulkollan for the sealing disc material, with a finely ground chromium surface applied to it. It has also been found that equally good results can be obtained with a combination of Vulkollan and high-alloyed nickel chromium steels.

Apart from Vulkollan which is the trade name for a valuable group of plastics such as ethylene glycol-adipic acid polyesters combined with naphthylene-1,5-diisocyanate, other materials with similar properties such as Desmophene or the like are of course also suitable for making the sealing discs according to the invention.

Figure 2:
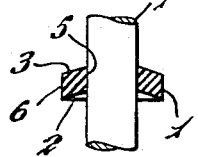
Figure 3:
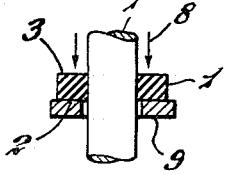
Figure 4:
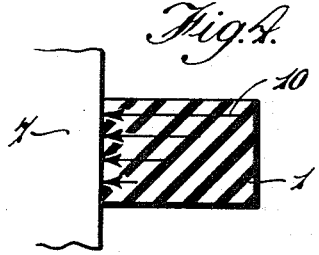
Figure 7:
Figure 5:
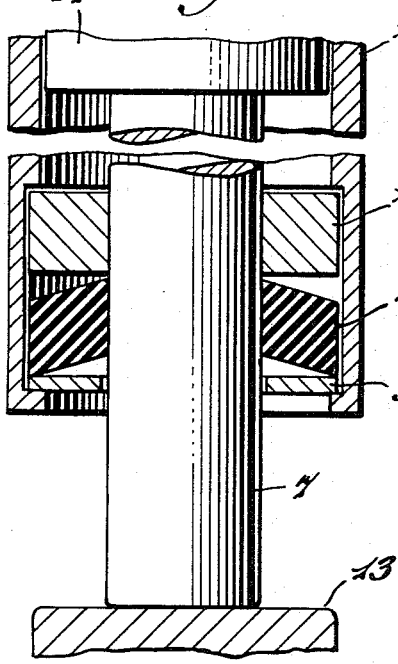
Figure 6:
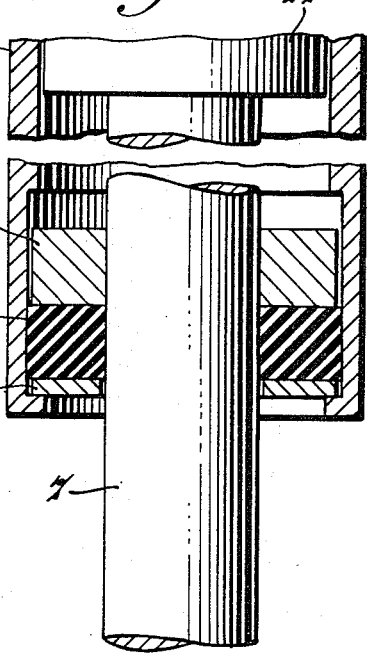

Further features of the invention and details of the advantages obtainable therefrom are contained in the following description of the accompanying drawings, which illustrates certain embodiments of the invention by way of example and in which:

FIG. 1 shows a sealing disc according to the invention in its flat state, on an enlarged scale, FIG. 2 shows it following application to, for example, the piston rod of a gas pressure spring, FIG. 3 shows it in the position which it assumes as soon as pressure is exerted on it, FIG. 4 is a section on a considerably larger scale through half of a sealing disc, indicating the distribution of internal tensions in the disc, FIG. 5 represents the application of the sealing disc according to the invention to a gas pressure spring, and shows, in longitudinal section, the arrangement in the end of the spring in the position assumed before the pressure gas is inserted into the spring, FIG. 6 is the same as FIG. 5 but with the seal in its operating position, and FIG. 7 shows a cross-section of part of a particularly advantageous embodiment of the sealing disc according to the invention, such as can be obtained by taking suitable measures during production.

FIG. 1 shows the sealing disc according to the invention in its flat position, for example as it leaves the stamping machine. The sealing disc 1 has two parallel, flat surfaces 2 and 3 and a central hole 4 with frusto conical side walls 5. It is preferable for the peripheral surface 6 forming the outer edge of the sealing disc 1 also to be conical; this has advantages other than for sealing the piston rod when the preferred application of the sealing disc to gas pressure springs is used, and also aids in filling the gas pressure springs and sealing them throughout.

The sealing discs according to the invention are made of a highly resilient, abrasion-resistant material, such as that known by the trade name of Vulkollan, or material having similar properties. Those which are to a certain extent capable of absorbing oil are preferred.

If the sealing disc in FIG. 1 is applied to the part to be sealed, for example to a piston rod 7 of a gas pressure spring—the diameter of the piston rod 7 being somewhat larger than that of the hole 4 in the sealing disc 1— the disc 1 will assume the position and shape shown in FIG. 2, i.e. the previously flat faces 2 and 3 become frusto conical, while the whole of the side wall 5 of the hole 4 is applied to the surface of the piston rod 7. The peripheral surface 6 also follows the general deformation and remains parallel to the wall 5 of the hole 4.

If pressure is exerted on the disc 1 in the direction of the arrow 8 in FIG. 3, the disc 1 is applied to an abutment 9 in the manner shown. That is to say, it assumes a shape where the surfaces 2 and 3 are again flat, the surfaces 5 and 6 remain perpendicular to the surfaces 2 and 3, and the disc 1 is enlarged in diameter.

In FIGS. 1 to 3 the disc 1 and abutment 9 are each shown in section, whereas the portion of the piston rod 7 shown is in perspective.

The deformations in the sealing disc resulting from its application to the piston rod 7 lead to the formation of stresses in the disc, the size and direction of which are indicated by the arrows 10 in FIG. 4.

The use of the high-pressure seal according to the invention makes it possible for the first time to make gas pressure springs having sufficient durability to enable them to be used in a great variety of applications. According to the invention a gas pressure spring comprises a cylinder 11 with a piston 14 slidable therein and, extending from the piston, a piston rod 7 projecting out of one end of the cylinder 11. The walls of the cylinder 11 are flanged on the inside at this end and hold the abutment 9. In certain cases the flanged side walls may themselves form this abutment for the disc 1. The piston 7 is held and guided in its axial direction of movement by a guide 12.

The use of the sealing disc 1 according to the invention in such a gas pressure spring makes the filling process particularly simple. The piston rod 7 is brought to bear on a stop 13 so that it cannot move outwardly as the pressure rises in the cylinder 11. The filling gas, which owing to the stringent requirements is an inert gas, is let into the cylinder through the annular space left between the members 11, 9, 1 and 12 in the position shown in FIG. 5. The position of the disc 1 here corresponds to its position and conformation in FIG. 2.

To conclude the filling process the stop 13 for the piston rod 7 is removed. The rod is then pressed outwardly and transposes the disc 1 to the position shown in FIG. 6, which again corresponds to that in FIG. 3.

Thus the sealing disc on the one hand forms a tight seal against the piston rod 7 owing to tis biassing (see FIG. 4), and on the other hand tightly seals off the wall of the cylinder 11 owing to the enlargement of its diameter following deformation.

With these few, simple parts gas pressure springs of the smallest dimensions can be made without any difficulty, and tests have shown that they are quite capable of taking a number of movements of the order of $10^6$ and more without any appreciable decline in the pressure prevailing in and essential to the functioning of the spring.

In order to give the disc 1 the original shape shown in FIG. 1, the material from which it is stamped can be cut on a soft and as far as possible homogeneous backing of fine structure. The frusto conical surfaces 5 and 6 are then simply formed through the highly resilient material of the disc 1 sinking to a certain extent into the soft backing. The pressure from the stamping or cutting tool is exerted from below in relation to the FIG. 1 illustration. If the stamping tool acts from above in the normal manner, the disc does indeed leave the tool in the form shown in FIG. 1 but with the narrowest part of the hole 4 at the base, i.e. so that the surface 2 is uppermost and the surface 3 at the bottom. FIG. 1 has thus been reversed merely to correspond to FIGUS. 2 to 6.

The surprising action of the sealing disc according to the invention appears to be due mainly to the fact that the originally narrower side of the hole 4 facing the direction from which pressure impinges on the disc cuts off the medium to be sealed from the surface, for example the piston rod 7, with the sharpness of a knife. This effect can be further reinforced by shaping the sealing disc as illustrated in FIG. 7. The cross-section of the sealing disc 1' is obtained simply as follows: the stamping tool penetrating into the material from which the disc is to be formed is arrested briefly when the greater part of the stamping stroke has been completed, so that the sliding friction arising during stamping between the side walls of the stamping knife and the material becomes a static friction. If the stamping tool now completes the cutting process this static friction must first be overcome, which means that the material of the sealing disc is pressed further into the soft backing. Thus the last portion of the hole in the disc is more tapered than the other portion.

I claim:

1. In gas containing apparatus including inner and outer telescoping members having coaxial facing cylindrical surfaces, sealing means for said members comprising a radially stressed highly resilient abrasion-resistant flat sealing disc having a central circular hole therethrough, the periphery of said hole being in sealing engagement with said cylindrical surface of said inner member and the outer periphery of said sealing disc being in sealing engagement with said cylindrical surface of said outer member, said sealing disc being such that in its unstressed state before mounting on said inner member, the hole therethrough is substantially frusto conical with its larger diameter corresponding substantially to the diameter of said cylindrical surface of said inner member, whereby when said sealing disc is in its flat operative position, the internal forces generated compress one side thereof tightly against said inner member; abutment means on said outer member abutting against one face of said sealing disc over the greater part of its area and locked against axial movement in a direction away from said sealing disc; and a rigid annular guide disc axially slidably mounted on said inner member and loosely fitting within said outer member, said guide disc abutting against the other face of said sealing disc and said sealing disc being maintained in a flat condition and tightly held against said abutment means solely by virtue of gas pressure applied to said guide disc.

2. Apparatus according to claim 1, wherein said abutment means includes an inwardly directed flange at one end of said outer member.

3. In a high pressure gas spring including a cylinder and a piston rod slidable therein, a sealing member for said spring comprising a thin flat resilient disc of annular configuration with an inner wall of frusto conical shape and an outer wall of frusto conical shape, said frusto conical walls being substantially parallel to each other when said disc is in a natural free state, an annular flat rigid guide member pressing against one flat side of said disc, an annular flat rigid abutment member pressing against the other flat side of said disc, said resilient disc having its inner wall sealed against the piston rod and its outer wall against the inner surface of the cylinder, said disc being of sufficient resiliency so that when the disc is sealed against said rod and cylinder its inner and outer frusto conical shaped walls remain parallel to each other and are deformed into a shape parallel to the rod and cylinder surfaces to be sealed and said walls are disposed in a configuration perpendicular to said flat sides of said disc.

4. A gas spring according to claim 3, wherein the guide member presses against that side of the disc corresponding to the smallest diameter of the inner wall when the disc is in its free state.

5. In gas containing apparatus including inner and outer telescoping members having coaxial facing cylindrical surfaces, sealing means for said members comprising a radially stressed highly resilient abrasion-resistant flat sealing disc having a central circular hole therethrough, the periphery of said hole being in sealing engagement with said cylindrical surface of said inner member and the outer periphery of said sealing disc being in sealing engagement with said cylindrical surface of said outer member, said sealing disc being such that in its unstressed state before mounting on said inner member, the hole therethrough is substantially frusto conical with its larger diameter corresponding substantially to the diameter of said cylindrical surface of said inner member and the outer periphery of the sealing disc is correspondingly frusto conical, whereby when said sealing disc is in its flat operative position, the internal forces generated compress the periphery of said hole at one side of the disc tightly against said inner member and the outer periphery of the other side of said disc tightly against said outer member, and abutment means abutting against one face of said sealing disc over the greater part of the area of said disc and held against axial movement with respect to said outer member in a direction away from said sealing disc.

6. Apparatus according to claim 5, wherein said sealing disc is maintained in a flat condition and tightly held against said abutment means by an annular rigid disc which presses against the other face of said sealing disc.

7. In gas containing apparatus including inner and outer telescoping members, the outer member having an inwardly directed flange and both members having coaxial facing cylindrical surfaces, sealing means for said members comprising a radially stressed highly resilient abrasion-resistant flat sealing disc having a central circular hole therethrough, the periphery of said hole being in sealing engagement with said cylindrical surface of said inner member and the outer periphery of said sealing disc being in sealing engagement with said cylindrical surface of said outer member, said sealing disc being such that in its unstressed state before mounting on said inner member, the hole therethrough is substantially frusto conical with its larger diameter corresponding substantially to the diameter of said cylindrical surface of said inner member and the outer periphery of said disc has a corresponding taper, whereby when said sealing disc is in its flat operative position, the internal forces generated compress the periphery of said hole at one side thereof tightly against said inner member and the outer periphery at the other side thereof tightly against said outer member; an abutment washer abutting against said other side of said sealing disc over the greater part of its area and locked against axial movement in a direction away from said sealing disc by said flange on said outer member, and a rigid annular guide disc axially slidable mounted on said inner member and loosely fitting within said outer member, said guide disc abutting against said one side of said sealing disc over substantially the whole of its area and said sealing disc being arranged to be maintained in a flat condition and tightly held against said abutment washer solely by virtue of gas pressure applied to said guide disc.

(References on following page)

References Cited by the Examiner

UNITED STATES PATENTS

| | | | |
|---|---|---|---|
| 2,251,135 | 7/1941 | Iknayan et al. | 83—19 |
| 2,282,312 | 5/1942 | Laugaudin | 267—65 |
| 2,375,518 | 5/1945 | Bolle | 83—19 |
| 2,513,533 | 7/1950 | Thornhill | 277—165 |
| 2,737,384 | 3/1956 | Laugaudin | 267—65 |
| 2,809,825 | 10/1957 | Allinquant | 267—65 |
| 2,931,673 | 4/1960 | Gondek | 277—165 X |
| 2,960,198 | 11/1960 | Keefe | 277—163 |
| 2,985,443 | 5/1961 | Smith | 267—64 |
| 2,992,864 | 7/1961 | de Carbon. | |

FOREIGN PATENTS

| | | |
|---|---|---|
| 26,167 | of 1905 | Great Britain. |
| 338,822 | 3/1936 | Italy. |

ARTHUR L. LA POINT, *Primary Examiner.*

ROBERT C. RIORDIN, *Examiner.*